United States Patent [19]
Rullo et al.

[11] Patent Number: 5,579,564
[45] Date of Patent: Dec. 3, 1996

[54] LOCKING SNAP-HOOK

[75] Inventors: James J. Rullo; Mark A. Colian, both of Binghamton, N.Y.

[73] Assignee: Buckingham Manufacturing Co., Inc., Binghamton, N.Y.

[21] Appl. No.: 497,831

[22] Filed: Jul. 3, 1995

[51] Int. Cl.⁶ .................................................. F16B 45/00
[52] U.S. Cl. ...................... 24/599.5; 24/599.4; 24/600.1
[58] Field of Search ........................... 24/599.5, 599.4, 24/599.1, 599.8, 599.9, 600.5, 600.1, 601.5; 294/82.2, 82.21

[56] References Cited

U.S. PATENT DOCUMENTS

| | | | |
|---|---|---|---|
| 731,162 | 6/1903 | Carter | 24/600.1 |
| 1,949,608 | 3/1934 | Johnson | 24/599.5 |
| 1,964,428 | 6/1934 | Duffy | 24/600.1 |
| 2,490,931 | 12/1949 | Thompson | 24/599.5 |
| 3,722,943 | 3/1973 | Kalua, Jr. | 294/82.2 |
| 4,062,092 | 12/1977 | Tamada et al. | 24/599.4 |
| 5,257,441 | 11/1993 | Barlow | 24/600.1 |

*Primary Examiner*—Victor N. Sakran
*Attorney, Agent, or Firm*—Salzman & Levy

[57] ABSTRACT

The present invention features a user-friendly locking snap-hook having an inwardly acting release mechanism that requires the simultaneous depression of interacting grips. Each of the gripping surfaces of these grips is usually flush or slightly recessed with the hook surface periphery, so as to prevent snagging or accidental damage during usage. The keeper member of the hook apparatus functions in a dual-purpose capacity. It forms the eye of the hook loop, and it functions as one of the grip members of the release mechanism. The keeper member opens inwardly, so that it will not afford the opportunity for it to become snagged or damaged during usage. The grip members each pivot inwardly into the safety hook body. The advantage of providing an internally locking mechanism, as opposed to the conventional external type of device, is that the user can avoid damaging his other safety equipment as well as the snap-hook mechanism itself.

4 Claims, 2 Drawing Sheets

LOCKING SNAP-HOOK

FIELD OF THE INVENTION

The present invention pertains to locking snap-hooks used for securing and suspending line workers onto utility poles and other elevated structures and, more particularly, to a locking snap-hook which is user friendly and features an internal locking mechanism, and an inwardly acting release mechanism that requires the simultaneous depression of interacting grips, having surfaces that are usually flush with the hook surface periphery to prevent snagging or accidental damage during usage.

BACKGROUND OF THE INVENTION

Locking snap-hooks are well known and are used in a myriad of service industries. Such devices are widely used by line workers who, in the course of their work, need to secure themselves upon utility poles.

Most snap-hook devices feature non-locking mechanisms. Non-locking apparatuses are notable for their innumerable design variations. Each design, however, has as its main objective providing a snap-hook that is easily snapped into place, but a snap-hook which will not prematurely or unintentionally release. Most snap-hooks work reasonably well; some hook mechanisms, however, work better than others.

Over the years, it has been alleged that single-acting release mechanisms can be unintentionally disengaged, e.g., when a worker leans against a pole or another work surface; induces a twist in the pole strap while working; etc.

One of the major problems of snap-hook design is the protrusion of the release handles or actuating buttons. When a release actuator projects above the outer (peripheral) surface of the snap-hook body, the actuator is subject to damage or activation by contact with working surfaces. A damaged release actuator can impair the safety of a worker in two ways: (a) it can prevent or impede the opening of the snap-hook, thus preventing a worker from quickly untethering himself from the pole or line to which he is secured; and (b) it can cause the premature or unintentional release of the snap-hook, thus providing little or no securement for the worker in his elevated work position.

Another problem common to snap-hook safety mechanisms is that an outwardly opening hook member, actuator and/or latch frequently tends to become snagged or damaged.

The present invention provides a locking snap-hook design that is user-friendly, features an internal locking mechanism that is operative via the simultaneous depression of two grip members, each of which has a gripping surface that is either recessed or substantially flush with the body of the snap-hook. The internal locking mechanism eliminates the need for protruding ears, which can damage the user's safety equipment and apparel. The protruding ears themselves can be bent, when misused, making them non-functional which problem, again is avoided by the present invention.

DISCUSSION OF RELATED ART

In U.S. Pat. No. 3,722,943, entitled SAFETY HOOK and issued to John Kalua, Jr., on Mar. 27, 1973, a safety hook release mechanism is illustrated which has a recessed actuator. The purpose of this recessed actuator is to release the end portion of the keeper member, thus opening the hook apparatus. This invention reflects the need to have the release mechanism recessed, so as to prevent accidental or incidental opening of the keeper member.

The aforementioned safety hook has several disadvantages. In KALUA, the release trigger is a single acting member, thus providing greater opportunity for accidental or inadvertent actuation. Additionally, the keeper member of KALUA opens outwardly, thus creating greater opportunity for the keeper to be snagged or damaged.

The current invention possesses an advantage that is similar to that identified above, in that its release mechanism actuator(s) is recessed or substantially flush with the snap-hook body. However, both of the abovementioned problems of the prior art design are addressed in the present invention by featuring two grips that must be actuated simultaneously to effect snap-hook release, and by the keeper member, designed to open inwardly, rather than outwardly, from the hook eye.

The present invention has two embodiments: (1) a first release member design that features clockwise and counter-clockwise pivoting grip members (FIG. 2), and (2) a release design providing two clockwise pivoting grip members (FIG. 1).

SUMMARY OF THE INVENTION

In accordance with the present invention, there is provided a user-friendly locking snap-hook for use with service workers, such as line workers. The snap-hook features an internal locking mechanism and an inwardly-acting release mechanism requiring the simultaneous depression of interacting grips. Each of the gripping surfaces of these grips is usually flush or slightly recessed with the hook surface periphery, so as to prevent snagging or accidental damage during usage and storage. The keeper grip member of the hook apparatus functions in a dual-purpose capacity. It forms the eye of the hook loop, and it functions as one of the grip members of the release mechanism. The keeper grip member opens inwardly, so that it will not afford the opportunity for it to become snagged or damaged during usage. The grip members each pivot inwardly into the safety hook body. In one embodiment, the grip members of the release apparatus each pivot clockwise; in a second embodiment, they pivot clockwise and counterclockwise, respectively. The locking mechanism grip member is designed with a camming slot for the pin rider of the keeper grip member. When both grip members are caused to pivot (as when both grip members are depressed by the operator), the pin rider will move within the camming slot to effect the opening of the hook eye.

It is an object of this invention to provide an improved locking snap-hook.

It is another object of the invention to provide a locking snap-hook having dual-release actuators that are each recessed or fit substantially flush within the hook apparatus body.

It is yet another object of this invention to provide a snap-hook having an internal locking mechanism and a release mechanism that requires the simultaneous actuation of twin grip members.

It is a further object of this invention to provide a locking snap-hook device in which the keeper of the eye loop functions in a dual capacity, viz., both as the grip member of the release mechanism and as the movable segment of the eye loop.

BRIEF DESCRIPTION OF THE DRAWINGS

A complete understanding of the present invention may be obtained by reference to the accompanying drawings, when considered in conjunction with the subsequent detailed description, in which.

For the sake of clarity and brevity, like elements and components of each embodiment will bear the same designations throughout the description.

DESCRIPTION OF THE PREFERRED EMBODIMENT

Generally speaking, the present invention features a locking snap-hook for workers in service industries. The locking snap-hook apparatus is notable due to its dual-actuated, simultaneously active, release grips, each of which pivots inwardly with respect to the hook body. The locking snap-hook device is also unique because it is user friendly, features an internal locking mechanism, and utilizes flush or recessed release grips, as well as a dual-functioning keeper member.

Figure 1:
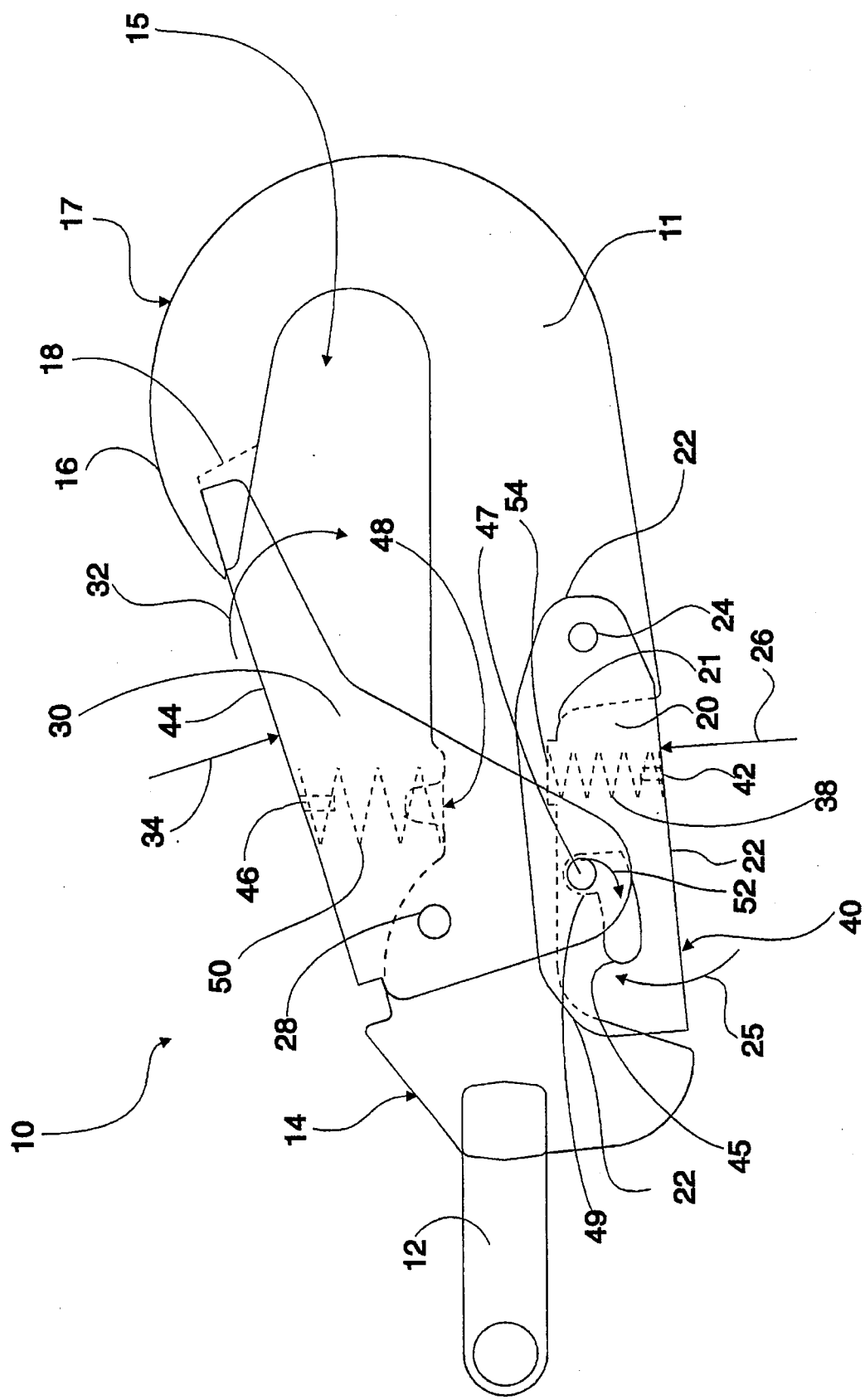
FIG. 1 illustrates a schematic plan view of a first embodiment of the locking snap-hook of this invention.

Now referring to FIG. 1, a first embodiment of the locking snap-hook apparatus 10 of this invention is shown. The safety hook 10 comprises a body member 11 that forms one portion of the eye loop 15 of the hook. The body member 11 has a strap-securing attachment 12 disposed on end 14, and a hook member 16 disposed on the distal end 17. The body member 11 is also characterized by a recess 20, shown by the dotted line 21. The recess 20 accommodates the movement therein of a first, locking grip member 22, which forms part of the hook release. The locking grip member 22 is caused to pivot clockwise (arrow 25) about a first pivot pin 24 affixed to the body member 11, when the locking grip member 22 is depressed inwardly (arrow 26) by the operator of the hook device 10.

The body member 11 has affixed thereto a second pivot pin 28. The keeper 30 nests within a recess 18 (shown by dotted line) disposed in the hook member 16. Keeper 30 forms a second, keeper grip member with respect to the locking grip member 22, as will be explained hereinafter regarding the operation of the release mechanism function. Forming the remaining portion of the eye loop 15 with hook member 16, the keeper 30 is caused to pivot clockwise (arrow 32) about the second pivot pin 28 when depressed inwardly (arrow 34) by the operator of the hook safety apparatus 10. The inward depression and the pivoting movement of the keeper 30 opens the eye loop 15, thus allowing the hook member 16 to be assembled onto or released from a dee ring, for instance.

The locking grip member 22 is biased against pivotable movement (arrow 25) and inward depression (arrow 26) by a first coil spring 38. First coil spring 38 is anchored to the wall 40 of locking grip member 22 by a pin 42, which is stamped thereinto at one end and anchored within the wall 21 (dotted line), of recess 20, by means of the well 54.

The keeper 30 (which is the second grip member of the release mechanism) is likewise biased against pivotable movement (arrow 32) and inward depression (arrow 34) by a second coil spring 50. The second coil spring 50 is anchored on one end to the wall 44 of the keeper 30 by means of a pin 46, which is stamped thereinto. The second coil spring 50 is anchored on its opposite end to body member 11 by means of dimple 48.

The keeper 30 cannot be depressed or pivot to open the eye loop 15, unless the locking grip member 22 is likewise and simultaneously depressed therewith. A rider pin 47 that is affixed to the keeper 30 rests within the dog-leg portion 49 of a slot 45 which is disposed in the wall of locking grip member 22. The keeper 30 cannot be depressed or pivot about pin 28 while the rider pin 47 is disposed in the dog-leg portion 49 of slot 45, since the rider pin 47 will remain locked against the wall that forms the dog-leg portion 49.

In order to free the rider pin 47 from the dog-leg portion 49 of slot 45, it is necessary to depress (arrow 26) the locking grip member 22, so that the rider pin 47 will move out of the dog-leg portion 49 of the slot 45, and ride into the horizontal portion of slot 45 (as shown by arrow 52). The freedom of the rider pin 47 to move horizontally (arrow 52) within the slot 45 by the depression of locking grip member 22, frees the keeper 30 to be depressed inwardly (arrow 34). In this fashion, the simultaneous depression of both locking grip member 22 and the keeper 30 is necessary in order to actuate the opening of the eye loop 15.

Figure 2:
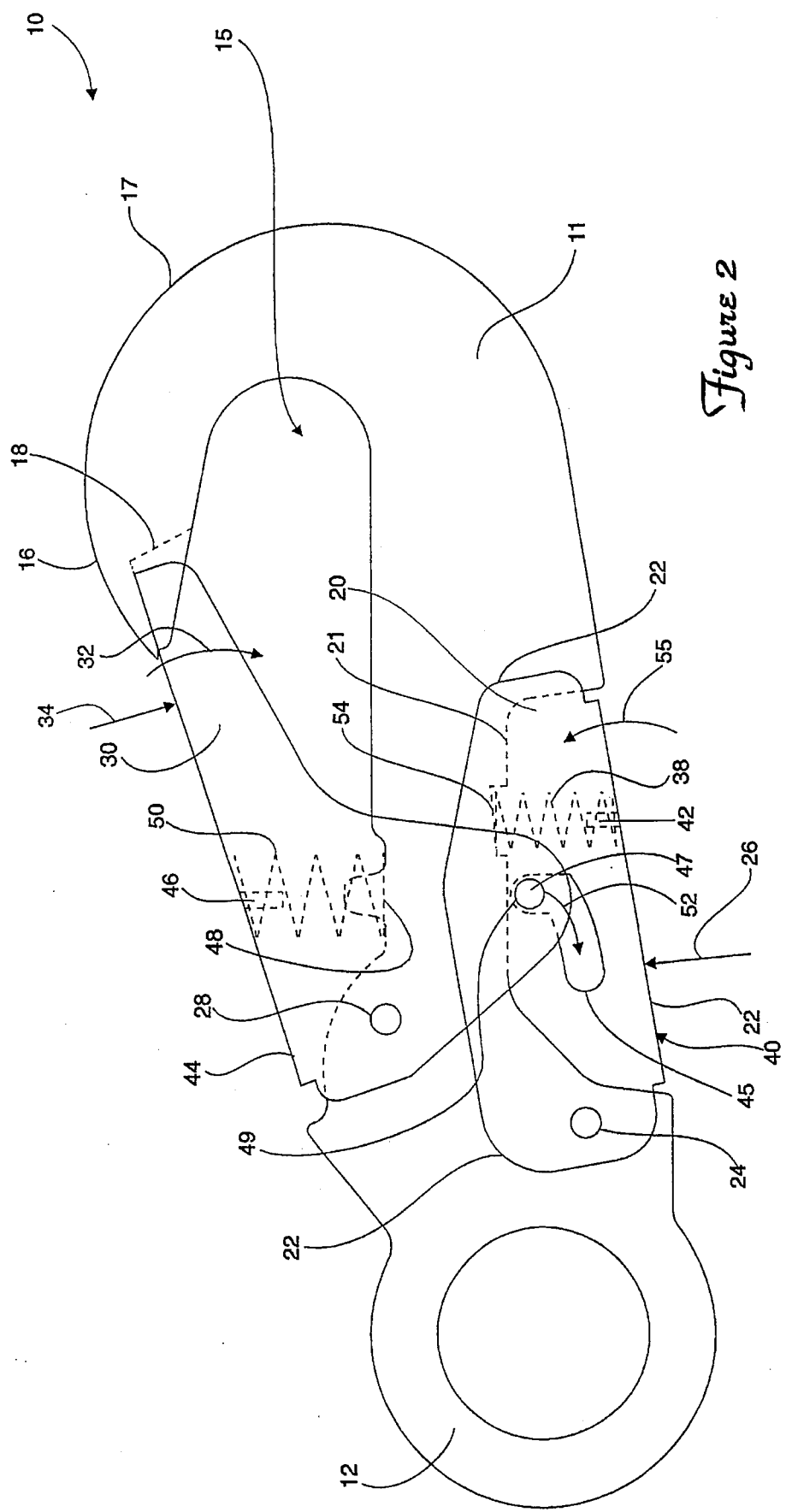
FIG. 2 depicts a schematic plan view of a second embodiment of the locking snap-hook of this invention.

Referring to FIG. 2, a second embodiment 10' of the safety hook of this invention is illustrated. The second embodiment 10' is identical to the first embodiment 10 in every respect with the exception of the strap-securing attachment 12' and the placement of pivot pin 24. The pivot pin 24 is in the second embodiment placed to the left of recess 20, thus making the pivoting of locking grip member 22 counterclockwise (arrow 55), rather than the clockwise (arrow 25) direction shown in FIG. 1. The coil spring 38 is again anchored within the wall 21 of recess 20, by means of the well 54.

The materials used to fabricate the body 11 of locking snap-hooks 10 and 10' shown herein are forged or stamped metal. The materials used for the keeper 30 and locking grip member 22 are stamped metal.

It should be observed that surfaces defined by wall 40 and wall 44 can either be flush or recessed, with respect to the body portion 11, so that the keeper 30 and the locking grip member 22 will not project above the outer periphery of the body section 11.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A locking snap-hook, comprising:

a body section;

means defining an eye loop, said eye loop being partially formed by said body section;

a keeper that pivotally movable with resoect to said body section, forming a remaining portion of said eye loop with respect to said body section, said keeper also defining a keeper grip member that is depressible with respect to said body section in order to function as part of a release mechanism; and a locking grip member that is pivotable about said body section and depressible with respect thereto, said locking grip member forming in conjunction with said keeper a release mechanism, said release mechanism further comprising means defining a dog-leg-shaped slot in said locking grip member, and a rider connected to said keeper that is movable within said dog-leg-shaped slot when said keeper and said locking grip member are substantially simultaneously depressed with respect to said body section, whereby said keeper will be caused to pivot about said body section to open said eye loop when said keeper and said locking grip member are substantially simultaneously depressed, and further whereby said keeper dually functions as a second grip member of said release mechanism, and wherein both said keeper and said locking grip member have outer wall surfaces that are substantially flush with respect to the periphery of said body section, to prevent snagging of said locking snap-hook on extraneous work surfaces.

2. The locking snap-hook in accordance with claim 1, further comprising a first biasing means disposed between said keeper and said body section, wherein said keeper is biased against pivotable movement with respect to said body section, and is pivotable about said body section only when said keeper is depressed against said first biasing means.

3. The locking snap-hook in accordance with claim 1, further comprising a second biasing means disposed between said locking grip member and said body section, wherein said locking grip member is biased against pivotable movement with respect to said body section, and is pivotable about said body section only when said locking grip member is depressed against said second biasing means.

4. The locking snap-hook in accordance with claim 2, further comprising a second biasing means disposed between said locking grip member and said body section, wherein said locking grip member is biased against pivotable movement with respect to said body section, and is pivotable about said body section only when said locking grip member is depressed against said second biasing means.

\* \* \* \* \*